United States Patent [19]

Kim

[11] Patent Number: 5,444,800

[45] Date of Patent: Aug. 22, 1995

[54] SIDE-MATCH AND OVERLAP-MATCH VECTOR QUANTIZERS FOR IMAGES

[75] Inventor: Taejeong Kim, Seoul, Rep. of Korea

[73] Assignee: AT&T Corp., Murray Hill, N.J.

[21] Appl. No.: 213,472

[22] Filed: Mar. 14, 1994

Related U.S. Application Data

[63] Continuation of Ser. No. 938,314, Aug. 28, 1992, abandoned, which is a continuation of Ser. No. 464,719, Jan. 12, 1990, abandoned, which is a continuation of Ser. No. 272,860, Nov. 18, 1988, abandoned.

[51] Int. Cl.⁶ .......................... G06K 9/36; G06K 9/46
[52] U.S. Cl. .................... 382/239; 348/420; 348/422; 382/253
[58] Field of Search .......... 382/56; 348/397, 405, 348/420, 422, 423; 358/432, 428

[56] References Cited

U.S. PATENT DOCUMENTS

| | | | |
|---|---|---|---|
| 4,578,704 | 3/1986 | Gharavi | 358/260 |
| 4,646,148 | 2/1987 | Lienard et al. | 382/56 |
| 4,646,356 | 2/1987 | Anderson et al. | 382/56 |
| 4,734,767 | 3/1988 | Kaneko et al. | 358/133 |
| 4,791,654 | 12/1988 | De Marca et al. | 358/133 |
| 4,811,112 | 3/1989 | Rutledge | 358/260 |

OTHER PUBLICATIONS

Aravind, R. and Gersho, Allen; "Image Compression Based on Vector Quantization With Finite Memory," Optical Engineering, vol. 26, pp. 570–580 Jul. 1987.

*Primary Examiner*—Yon J. Couso
*Attorney, Agent, or Firm*—Katharyn E. Olson; Wilford L. Wisner

[57] ABSTRACT

There is disclosed a method and apparatus for data coding for image transmission or storage in which vector quantization enables good image quality at reduced transmission or storage bit rates by directly employing spatial contiguity with a prior block of data, or a one-row-prior block of data in a way that directly controls intensity continuity between spatially close pixels of the adjacent blocks in two directions. The technique includes both "side-match" (no overlap) and "overlap-match" vector quantization. The technique is relative demanding of memory space and logic capacity in the encoding of the image information; but the decoding can be relatively simple and thus is well adapted for archiving and subsequent retrieval of two-dimensional information.

4 Claims, 8 Drawing Sheets

SIDE-MATCH AND OVERLAP-MATCH VECTOR QUANTIZERS FOR IMAGES

This application is a continuation of application Ser. No. 07/938,314, filed on Aug. 28. 1992, now abandoned.

BACKGROUND OF THE INVENTION

Data processing for image transmission has used a variety of techniques in the past for reducing the bit rate required for transmission of the data. A number of these techniques have been broadly characterized as image compression, which means that perceptually irrelevant aspects of the image data are removed and the redundancies in the data are reduced by the coding technique in order to reduce the bit rate required. The variety of techniques has multiplied as the requirements for image quality have increased at the same time that the demand for the available channel bandwidth has increased.

One of the techniques for achieving such results is the technique known as image compression using vector quantization, in which blocks or vectors, each representing a group of individual pixels, are independently encoded. This technique has been demonstrated to be effective for achieving moderately low rates in bits per pixel.

To maintain the same quality of transmission and further lower the bit rates, it has been necessary to employ a type of vector quantization that can be characterized as vector quantization with memory. Memory is incorporated into the encoding procedure by using memory of previously encoded blocks in each successive input block. A particular type of this technique known as finite state vector quantization (FSVQ) employs a number of states which summarize key information about previously encoded vectors to select one of a family of so-called codebooks to encode each input vector. An example of such a technique is found in the article entitled "Image Compression Based on Vector Quantization With Finite Memory" by R. Aravind and Allen Gersho in *Optical Engineering*, Vol. 26, July 1987, pp. 570–580.

The encoder and decoder of such a system have a feedback structure in which the internal states determined by the outputs are fed back and used together with the inputs for encoding and decoding. The goal of such finite state techniques is to maintain the quality of the transmission obtained while achieving the desired low bit rate. If the internal state can accurately represent a small region that contains the input vector to be encoded, finite state vector quantization can achieve the aforesaid goal by using a relatively small time varying set of codebooks.

The above referenced technique and others in the image coding environment have faced two special factors relating to image coding. One is the fact that since the images have two dimensional properties, each pixel block, usually a rectangular pixel block, has more adjacent pixels outside the block than does a one-dimensional sample block as in the voice coding environment, and the other is the fact that most common images have very high adjacent pixel correlation. We refer to the former property as spatial contiguity.

Nevertheless, prior attempts to exploit spatial contiguity have failed to make maximum use of the possibilities for both improving the quality of transmission and the reduction of the bit rate. The above-referenced system of Aravind and Gersho diminishes the effect of spatial contiguity by transforming information about the spatially contiguous pixels into indirect information, such as the existence and the types of intensity discontinuities.

The technique of the above-cited article of Aravind and Gersho looks for the edges of images within each block; but for state codebook blocks which have been chosen as best matching image blocks having such internal edges, no pixel is treated more importantly than any other pixel in such codebook block in matching to subsequent adjacent image blocks which may have a continuation of the image edge. Thus, part of the relevance of spatial contiguity is not brought to bear upon the encoding of the subsequent image block, according to the Aravind and Gersho technique.

It is an object of this invention to improve the performance of such coding techniques in either or both of the respects of transmitted image quality and reduction of the required bit rate for transmission. Moreover, a newly blooming market for economical storage techniques for images for archival, for example, for medical, geophysical, aerial or satellite photography purposes, for electronic shopping or for video teleconferencing, increases the need to push such techniques to the limit and furthermore, to make simplicity of the decoding a primary objective of the system even at the expense of some complication of the encoding techniques.

SUMMARY OF THE INVENTION

According to the invention, it has been discovered that the most effective way of incorporating memory into such a system is to employ the 2-dimensional spatial contiguity in a way that directly controls intensity continuity between spatially close pixels of the adjacent blocks. There is stripped away any consideration of indirect information, such as classification of discontinuities, so that the invention uses state codebooks chosen for best intensity matching to the relatively nearest pixels of the vectors representing the prior block and the one-row-prior block, in order not to lose the significance of their spatial contiguity.

The more direct application of spatial contiguity which is the subject of this invention is herein termed "side-match" or "overlap-match" vector quantization for 2-dimensional information blocks.

Moreover, the invention recognizes that variable length coding based on training image statistics or on the input image itself further increases the effectiveness of my modified system. Since the proposed variable length noiseless coding scheme is simple to use, its full description can be transmitted to the receiver in a communication system with an insignificant increase in bit rate. In fact, according to this feature of the invention, a family of variable length noiseless codes are described that closely achieve so-called channel symbol entropies. This particular feature of the invention can also be retrofitted to other finite state vector quantization designs.

BRIEF DESCRIPTION OF THE DRAWINGS

Other features and advantages of the invention will become apparent from the following detailed description taken together with the drawings in which.

DETAILED DESCRIPTION

Figure 1:
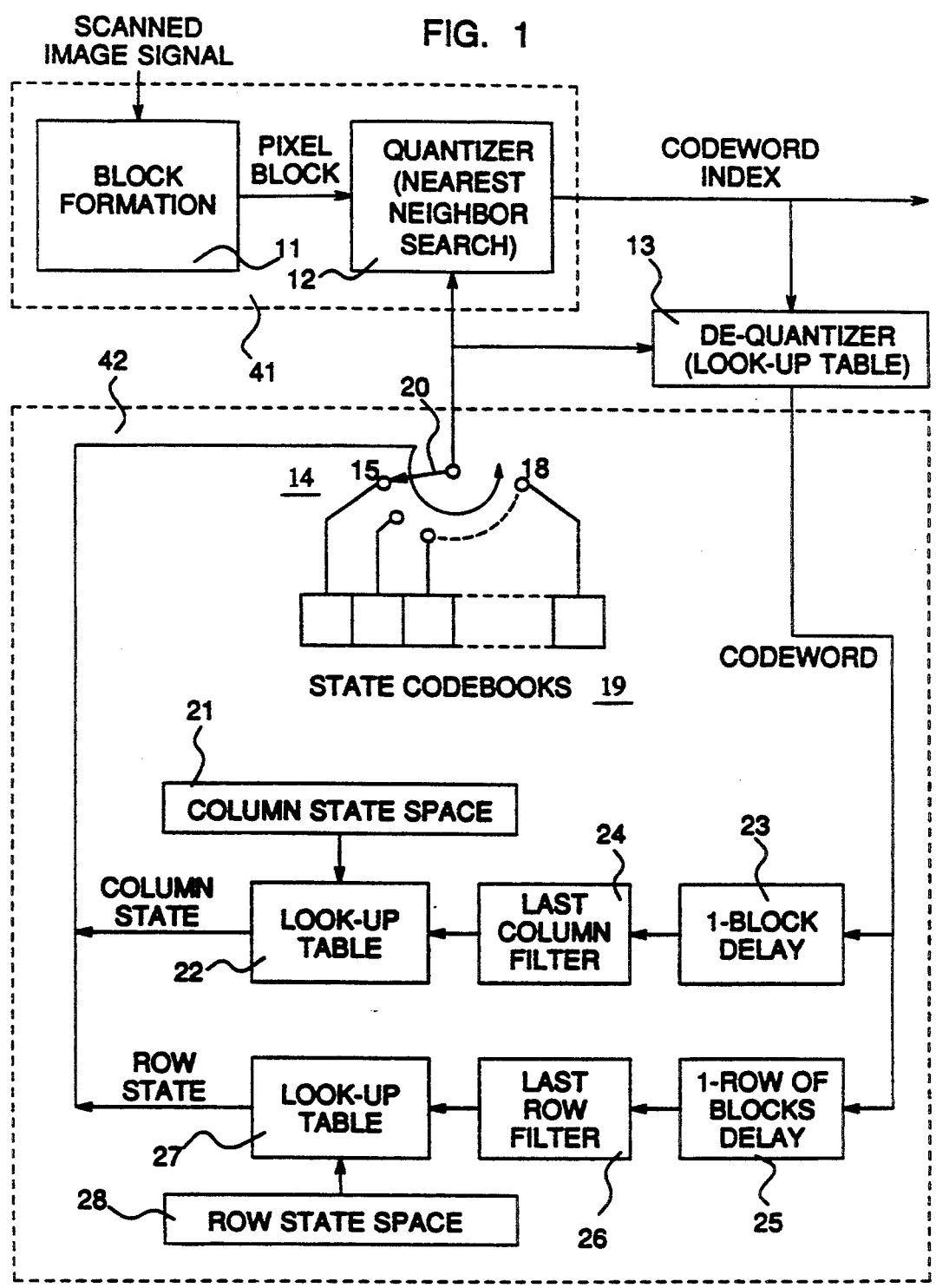
FIG. 1 is a block diagrammatic illustration of a transmitter for communication system according to the invention.

In FIG. 1, there is shown a basic embodiment which is organized similarly to systems that can be used to practice encoding algorithms of the finite state vector quantization type, including that disclosed in the above cited article by Aravind et al; but the embodiment of FIG. 1, upon a closer perusal, will be seen to be specifically adapted to the particular features of the invention. More specifically, in FIG. 1 is shown an embodiment of the invention used in a transmitter of a communication system transmitting images between remote locations, The organization of this transmitter is adapted to admit the scanned image signal, scanned in the conventional way for television image transmission but optionally with higher resolution. It also includes a way of forming the image pixels into blocks as shown by the block formation stage 11 of FIG. 1. Each block is a 4×4 block of pixels; for example, the first block includes the first four pixels of each of the first four rows of scanned image pixels. Each resulting pixel block then passes to quantizer 12 which performs a nearest neighbor search for selecting the desired entry from among the particular codebook selected as described hereinafter. The search is guided by the logic circuit 42 communicating with the encoding section 41, including block 11 and quantizer 12. The logic is such as to enable the appropriate codeword index to be transmitted with the appropriately low bit rate but with optimum matching of the pixel block edges as will be more fully described hereinafter. The block formation and the quantizer nearest neighbor search are performed as described in Section 2.1.1 of the article of Aravind and Gersho. Briefly, this can be described as follows: The block of pixels is, for example, a four-by-four block of the smallest image units. These blocks are assembled in the most compact way as one might expect so that they are 4 pixels wide and 4 pixels deep in the direction in which the image is developed across the display or other 2-dimensional representation of the image, row by row. In other words, four rows are employed to generate the blocks of adjacent pixels. The pixel blocks are then sent to the quantizer. From the currently dynamically selected state codebook through the selected one of the set 14 of switch positions, for example, from switch 20 the limited codebook entries $C_1, C_2, \ldots C_n$ are compared on a minimum distance basis with the actual input pixel block $x$ for each pixel in the block. The value of $C_i$ is selected which yields the smallest mean squared error; and the index of that codebook value, that is, the value of $i$ is passed from quantizer 12 as the transmitted codeword index. At the same time this codeword index is used as part of the history of the image information which is used to dynamically select the next state codebook which will be used to encode the next block of pixels.

The logic for employing this image history to select the next state codeword is found in logic circuit 42 of FIG. 1. The previous codeword index is passed to dequantizer 13, which is basically a lookup table that converts the previous state codebook index back to a codeword representative of a block; and the resulting output is subjected to delays and other logic processing to affect the subsequent positioning of circuit switch 20. In order that the dequantized values will affect only an adjacent block of pixels, the signals are passed through the respective one block delay 23 and one row of blocks delay 25 in order to arrive at the column state output and row state output, respectively, at the appropriate times. The lookup tables 22 and 27 involve the column states space 21 and row states space 28, respectively, optionally, to reduce the number of state codebooks 19. The column states space 21 and row state space 28 are the sets of representatives for last pixel columns and last pixel rows, respectively, of all the representative blocks in all of the state codebooks 19.

Above mentioned blocks 21, 22, 27, and 28 are the mechanism for reducing the number of state codebooks which in turn reduces the required memory space (in the encoder). If there is no restriction on the number of state codebooks or upon memory space, these blocks can be eliminated. From among those values of columns and rows of pixels being considered, filters 24 and 26 selectively pass only the last pixel column and the last pixel row, respectively, which are the pixel column and pixel row immediately adjacent to, or overlapped by, the current block being encoded. These are the most relevant pixels to the encoding of the current pixels if discontinuities of values in the image are to be avoided. It is thus in this area of logic circuit 42 that the invention achieves the distinction in organization and operation from that of the above cited reference of Aravind and Gersho. The difference lies in the techniques for selecting one of the state codebooks 19 based on the particular column state arriving at the column state output and the particular row state arriving at the row state output. These values are then applied to control position of switch 20 to control the state codebook which is used in quantizer 12 for the nearest neighbor search in encoding the current block of pixels to be encoded. For example, the state codebooks could be ordered so that sequential sets of row states known to be used for like indices of column states are sequentially arrayed by row state index, followed by the sequential array of row states for the next sequential index of column states, and so on, until all column states known to be used are sequentially arrayed. Then, the column state index output from block 22 causes the appropriate counting of column state positions by switch 20, after which the row state index output from block 27 causes the appropriate counting of row state positions of switch 20, within the appropriate array of rows of the previously counted column state. The look-up tables 22 and 27 are needed because, for the reduced set 19 of state codebooks not every row state index of the super codebook (described hereinafter) is used with every column state index of the super codebook. The selected state codebook will be the one which according to the process of codebook design from statistically similar blocks in the super codebook will be likely to produce the same statistical 2-dimensional properties, that is the most similar adjacent edge, which is a column edge if it was the preceding block or an adjacent row edge if it were the one-row-prior block. Since the inputs to the blocks 22 and 27 from state spaces 21 and 28 can have only previously determined finite possible values and the inputs from filters 24 and 26 can have only previously determined finite possible values from a larger set of values, the nearest neighbor search operations in blocks 22 and 27, can be implemented by look-up tables, if desired.

It should be emphasized that all the processes employed in logic circuit 42 are lookup table processes and can be in general accomplished very quickly as compared to the computation intensive nearest neighbor search that occurs in quantizer 12.

Figure 2:
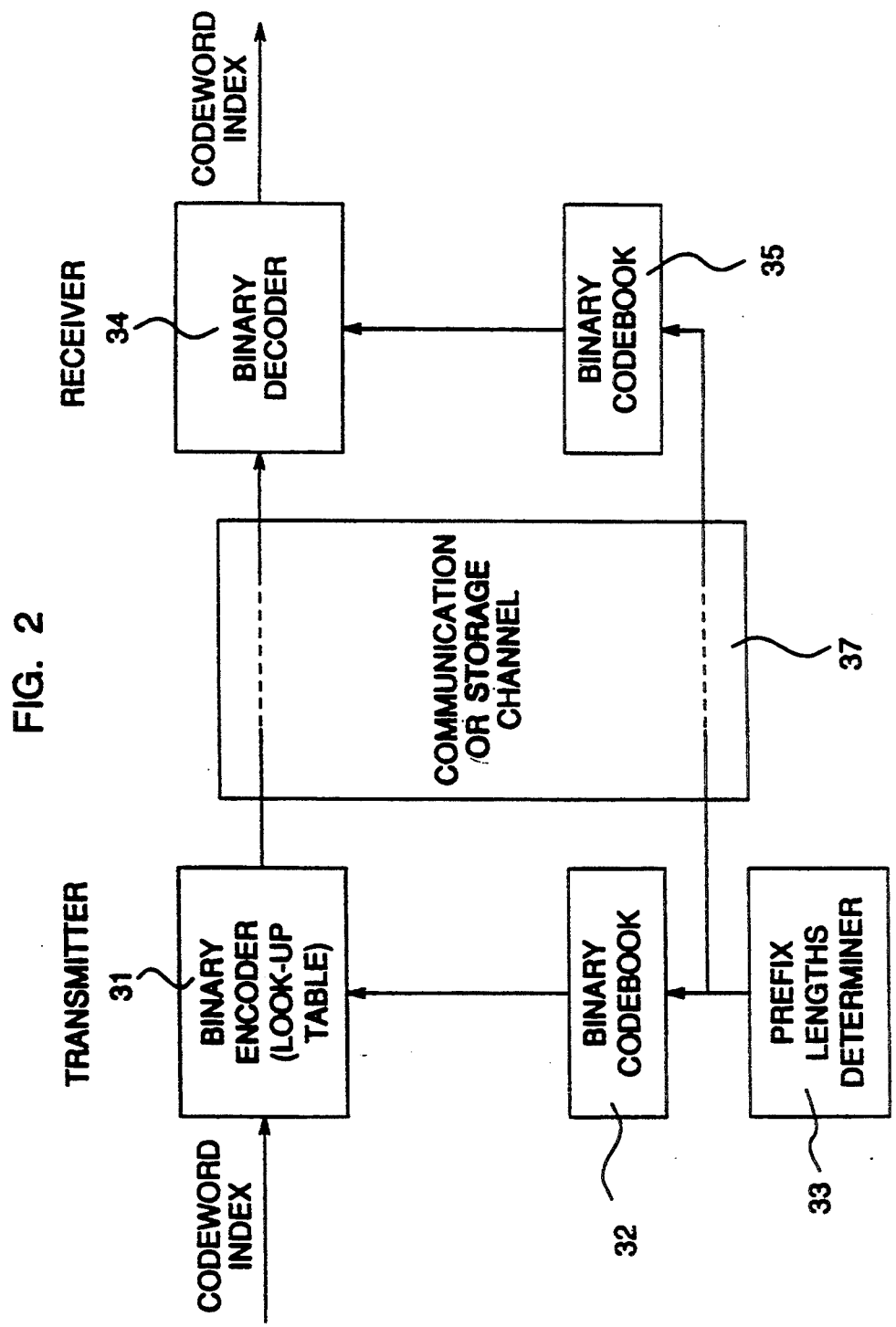
FIG. 2 is a block diagrammatic showing of the transmitter and receiver in such a system.

In FIG. 2 is illustrated a further handling of the codeword index output of FIG. 1 to prepare it for actual transmission over transmission medium and for reception at the receiver. In other words, the codeword index is not necessarily in an optimum binary form for transmission given the characteristics of the medium or the statistical characteristics of the image itself.

In other words, the codeword index is subjected to further binary encoding in encoder 31 which will incidentally involve further reduction of bit rate in response to a prefix length determination in prefix length determiner 33 and the transmission binary codebook 32.

Figure 3:
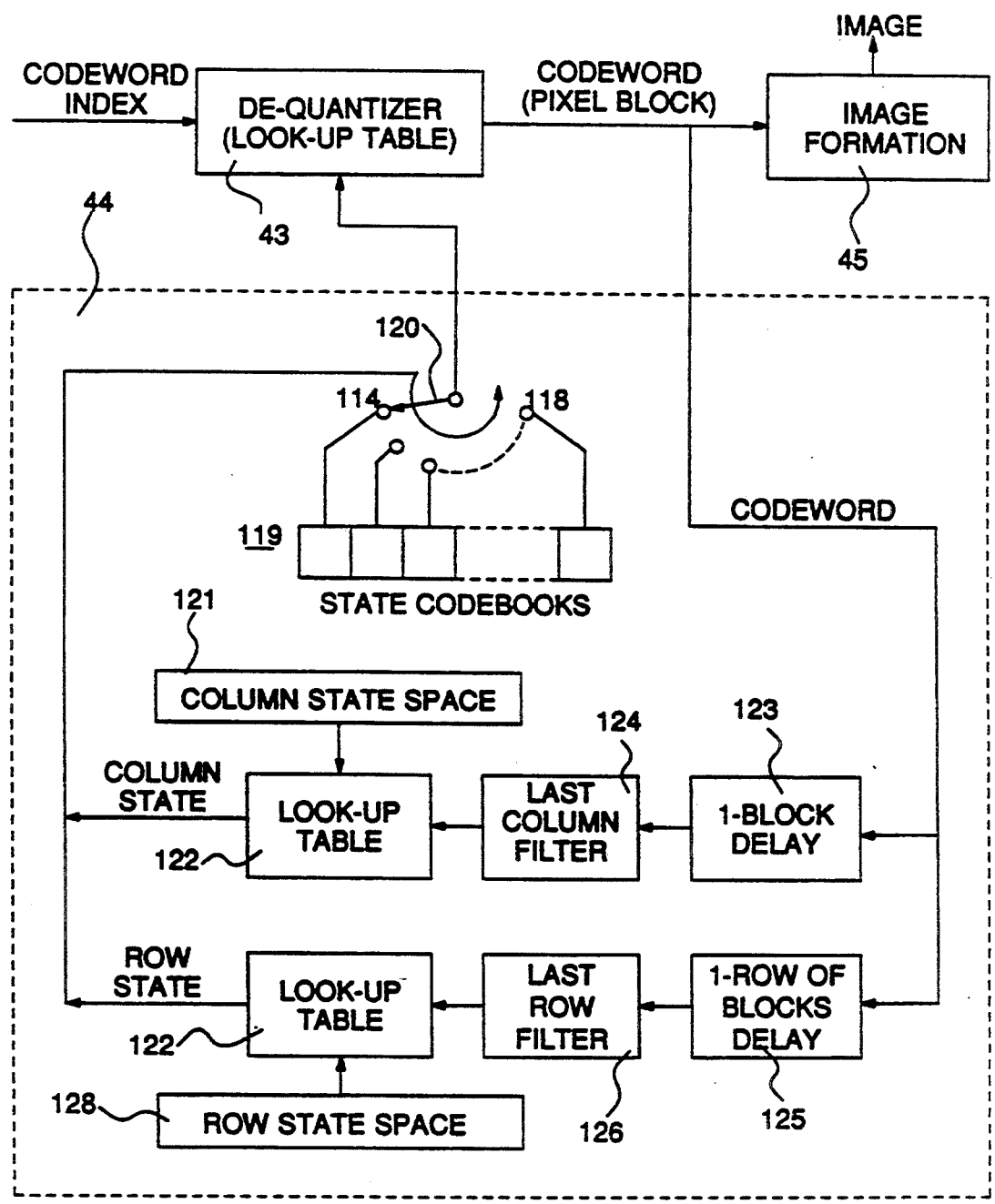
FIG. 3 is a block diagrammatic showing of the receiver according to the invention.

Variable length noiseless codes are advantageous for the system of FIGS. 1 and 3. The one-to-one mapping according to FIG. 2 that converts channel symbols into binary sequences is called the binary encoder, and its inverse is called the binary decoder. The channel symbols coming out of a source encoder, such as finite state vector quantizer FSVQ, have a finite alphabet (i.e., an alphabet of finite size). Given a class of sources, images in this case, the channel symbols assume a certain probability distribution. Since there are well established theories of noiseless codes for the symbols from a finite alphabet with a known probability distribution, one can simply apply optimal noiseless codes to channel symbols. When the alphabet size is fairly large, however, blind application of noiseless codes such as the Huffman code has potential problems. For example, the binary encoder or decoder can be quite complicated or may require very large buffers. These problems are mainly caused by the wide variation of binary codeword length. The length of a codeword in a noiseless code is sometimes referred to as a level of the noiseless code. On the other hand, when the channel symbol distribution is not known, the optimal noiseless code designed for one probability distribution can be very poor for another distribution. One might argue that since the binary encoder has the channel symbol statistics, the corresponding optimal noiseless code can be used every time. In such cases, the description of optimal noiseless code needs to be also transmitted to the binary decoder for correct decoding. Unfortunately, such description may contain more than a negligible amount of information. That is, the transmission of the optimal noiseless code description may considerably increase the overall bit rate. The cure for all the above mentioned problems is to limit the the number of levels of the noiseless code. Then the question is "Will any noiseless code with only a few levels perform well?" Owing to the special shape of the channel symbol distribution encountered in the application, we will show that the answer is "yes" for Side-Match Vector Quantizers and Overlap-Match Vector Quantizers.

After transmission over the communication channel or storage channel 37 to the receiver, the binary code is reconverted to the codeword index by binary decoder 34 according to lookup binary codebook 35 which is like binary codebook 32 of the transmitter. The variable length coding logic 36 of FIG. 2 can be implemented according to the mathematics described below. Alternatively, it can be implemented according to other variable-length noiseless encoding schemes found in the art. The above described version is a preferred alternative but not an exclusive alternative for purposes of the present invention.

In FIG. 3 is shown the receiver which couples to the output of binary decoder 34 and provides the output image of high quality relative to the number of bits transmitted over the communication channel 37. That receiver includes dequantizer 43 which is again a lookup table operation identical to that of dequantizer 13 in the transmitter and itself and a logic circuit 44 which is essentially identical to logic circuit 42 of the transmitter. The image formation 45 basically reverses the process that forms blocks of pixels in block formation circuit 11 of FIG. 1, subject to some additional operations for overlap matching and decoding, which will be described hereinafter.

Finite State Vector Quantizer Operation

The operation of the transmitter of FIG. 1 can be more definitively mathematically characterized as follows: The finite state vector quantizer structure is basically that of finite state machines, as is defined in the area of digital circuits. Given a vector dimension k, at each sampling time instant i, the encoder maps a k-dimensional source vector $x_i$ into a channel symbol $y_i$ from a finite alphabet for transmission, and any corresponding receiving decoder maps the channel symbol back into a k-dimensional reproduction vector $\hat{x}_i$. For the purpose of digital transmission and/or storage, the channel symbols are commonly represented by binary sequences.

In order to describe the finite state vector quantizer encoder and decoder in detail, we break them down into several building blocks or components. These components are (1) a state space S, which is a finite set of states, (2) a set of state codebooks $\{C_s: s \epsilon S\}$, (3) a quantizer q, (4) a dequantizer p, which is a codebook(table)-lookup function, and finally (5) a next state function f. A general description of these building blocks follows. The state space is a collection of M symbols called states, i.e., $S = \{s_1, s_2, \ldots, s_M\}$, where $s_1, s_2, \ldots, s_M$ denote states. Each state codebook is a set of N k-dimensional vectors called codewords. The set of state codebooks are indexed by the states, and hence, the total number of state codebooks is equal to the state space size which is M. The union of all the state codebooks is called the super-codebook and is denoted by C. That is, $C = \cup_{s \epsilon S} C_s$. The index set $Y = \{1, 2, \ldots, N\}$, that all the state codebooks have in common, is called channel symbol space. The reason for this name is that the indices of codewords within the state codebook are channel symbols that will be eventually transmitted or stored via the channel. The quantizer is a mapping from the Cartesian product of k-dimensional Euclidean space $R^k$ and the state space S to the channel symbol space Y. That is, $q: R^k \times S \rightarrow Y$, where x denotes the Cartesian product. One can also understand the quantizer to be a collection of mappings $\{q_s: s \epsilon S\}$, such that each $q_s$ is a mapping from $R^k$ to Y. For the convenience of description, however, we will use the former definition of the quantizer. The idea that the quantizer achieves data compression implies that the quantizer should obviously be a many to one mapping, and thus, its inverse does not exist. However, we define a mapping p, called de-quantizer, to mimic the inverse of the quantizer. In particular, the de-quantizer is a mapping from Y×S to C. If one considers the quantizer to be a collection of mappings $\{q_s: s \epsilon S\}$, the de-quantizer can also be viewed as a collection of one-to-one mappings $\{p_s: s \epsilon S\}$, such that $p_s: Y \rightarrow C_s$. In this case, each $p_s$ is a table-lookup function that maps each channel symbol into the codeword in $C_s$ whose index is the same as the channel symbol. Since the finite state vector quantizer encoder and decoder function as finite state machines, their internal states should be updated at every sampling instant. The update of internal states is done by the next state function f. The next state function f is a mapping from the J-fold Cartesian product of the super-codebook C to the state space, where J is the number of past reproduction vectors that contribute to the generation of the next state. That is, $f: x_{j=1}^J C \rightarrow S$. In other words, the next state function produces the next state from the finite past history of selected codewords.

Now we are ready to characterize the finite state vector quantizer encoder and decoder in terms of the building blocks described above. The finite state vector quantizer encoder can be characterized by the quintuple: a state space, a set of state codebooks, a quantizer, a de-quantizer, and a next state function, i.e., $(S, \{C_s, s \epsilon S\}, q, p, f)$. At a sampling instant i, let us assume that the encoder has a state $s_i$ in S. Then, the quantizer maps a k-dimensional source vector $\underline{x}_i$ into a channel symbol $y_i$ such that $y_i$ is the index of the codeword within the state codebook $C_{si}$, which best approximates $\underline{x}_i$ with respect to a certain criterion. The resulting codeword, which is the reproduction vector, is denoted by $\hat{\underline{x}}_i$. A simple and ubiquitous criterion is the minimization of the mean squared error, which is defined as $$d(\underline{x}_i, \hat{\underline{x}}_i) = \frac{1}{k} \sum_{j=1}^{k} ([\underline{x}_i]_j - [\hat{\underline{x}}_i]_j)^2,$$

where $[\underline{x}_i]_j$ and $[\hat{\underline{x}}_i]_j$ are the j-th components of vectors $\underline{x}_i$ and $\hat{\underline{x}}_i$, respectively. Basically, the quantizer in our discussion is a memoryless vector quantizer with the state codebook as its codebook. Therefore one may find a variety of quantizer structures that can be used in finite state vector quantizer, for example, the full search vector quantizer, which is described here, the tree searched VQ, the multi-step VQ, and the product VQ. In this paper, however, we will only consider the full search VQ. Let $\eta$ denote the function that maps an element of a set into its index, assuming unique indexing. For example, if $A = \{a_1, a_2, \ldots, a_l, \ldots, a_L\}$, then $\eta(a_1, A) = 1$. Now the quantizer operation at the sampling instant i is summarized in the following equation.

$$y_i = q(\underline{x}_i, s_i) = \eta([\min_{\underline{c} \epsilon C_{si}}^{-1} d(\underline{x}_i, \underline{c})], C_{si}),$$

where $\min^{-1}$ denotes the function meaning "the variable that minimizes the following quantity". The term inside the rectangular bracket represents the codeword of the minimum distortion from the source vector, and is called the reproduction vector.

After a channel symbol is produced by the quantizer, the encoder needs to update the state to prepare for the encoding of the next source vector. The next state function performs this update by mapping the finite past reproduction vectors into the next state $s_{i+1}$. Note that the reproduction vectors are not available yet, though they are implicitly determined during the quantization process. The de-quantizer 13 makes reproduction vectors available to the next state function. The de-quantizer is a table-lookup function where the lookup table is a state codebook. Given a sampling instant i and a state $s_i$, the de-quantizer maps a channel symbol $y_i$ into a codeword in $C_s$ whose index is $y_i$. In other words, if $\hat{\underline{x}}_i$ denotes the reproduction vector at time i, $\hat{\underline{x}}_i = p(y_i, s_i)$ such that $\hat{\underline{x}}_i \epsilon C_{si}$ and $y_i = \eta(\hat{\underline{x}}_i, C_{si})$. As the reproduction vectors are now available through the de-quantizer, the next state function is represented by the following relation:

$$s_{i+1} = f(\hat{\underline{x}}_i, \hat{\underline{x}}_{i-1}, \ldots, \hat{\underline{x}}_{i-j+1}).$$

If we assume that the initial state $s_0$ is given, the quantizer and the next state function operate repeatedly, as described above, to produce the sequence of channel symbols $y_0, y_1, y_2, \ldots$ from the sequence of source vectors $\underline{x}_0, \underline{x}_1, \underline{x}_2, \ldots$. Through transmission or storage, this sequence of channel symbols is received by the decoder, and then, converted back into a sequence of reproduction vectors, denoted by $\hat{\underline{x}}_0, \hat{\underline{x}}_1, \hat{\underline{x}}_2, \ldots$.

The finite state vector quantizer decoder is characterized by the quadruple: a state space, a set of state codebooks, a de-quantizer, and a next state function, i.e., $(S, \{C_s: s \epsilon S\}, p, f)$. All these components are identical to those of the finite state vector quantizer encoder and are already described in detail. As the finite state vector quantizer decoder receives a channel symbol, the dequantizer selects the codeword in the state codebook corresponding to the internal state such that the index of the codeword is identical to the received channel symbol. Based on the selected codewords (or reproduction vectors), the next state function updates the internal state of the decoder. If we assume that the initial state of the encoder is also known to the decoder, the next state function of the decoder can keep track of the encoder states. Therefore, the reproduction vectors produced by the decoder is identical to the corresponding reproduction vectors determined in the encoder.

In summary, given the initial state $s_0$, the finite state vector quantizer encoding is the progressive repetition of the following operations.

$$y_i = q(\underline{x}_i, s_i)$$

$$\hat{\underline{x}}_i = p(y_i, s_i)$$

$$s_{i+1} = f(\hat{\underline{x}}_i, \hat{\underline{x}}_{i-1}, \ldots, \hat{\underline{x}}_{i-j+1})$$

Given the initial state $s_0$, the finite state vector quantizer decoder operation is summarized as the progressive repetition of the following operations.

$$\hat{\underline{x}}_i = p(y_i, s_i)$$

$$s_{i+1} = f(\hat{\underline{x}}_i, \hat{\underline{x}}_{i-1}, \ldots \hat{\underline{x}}_{i-j+1})$$

Side-Match Vector Quantization

A side-match vector quantizer according to the invention is within a class of FSVQ. As the name "side-match" suggests, the side-match vector quantizer tries to make the intensity (grey level) transition across the boundaries of the reproduction vectors as smooth as possible. The assumption behind side-match vector quantizers is that the pixel rows and columns of the source image are first order Markov processes. If the assumption is true, then the pixels contiguous to the current block (the block to be encoded) carry all the information about the current block which is contained in all the past history. In other words, if the pixel rows and columns are first order Markov, given the pixels that are contiguous to the current block, the current block is conditionally independent of all the rest of the past history. Therefore, ignoring the quantization effect on the past history, the state has to be generated solely by the pixels contiguous to the pixel block to be encoded. This fact is closely related to the concept of spatial contiguity stated earlier (see the striped areas in FIG. 7). The assumption also suggests that the best selection of the state codebook is the set of codewords whose boundary pixels are most similar to the reproduction pixels that contributes to the state generation. In other words, the state codebook should be the set of codewords with the best "side-match". The advantage of "side-match" over other types of finite state vector quantizer is that, even if the reproduction vector is not the best codeword in the super-codebook, the error it introduces is often less visible in the reproduced image.

In FIG. 2, the overall structure of side-match vector quantizers is given as a block diagram. All the elements in the diagram will be described shortly. To avoid possible confusion in this section, we will use the term blocks for the matrix-type vectors with rows and columns, and vectors for row vectors or column vectors.

In order to characterize side-match vector quantizer using the language developed in the previous section, we begin by defining the state space. Suppose that all source (pixel) blocks are of size m by n, i.e., matrices with m rows and n columns of pixels. Each state is represented by a pair of a column state vector of dimension m and a row state vector of dimension n. That is, a state is of the form $(\underline{u}, \underline{v})$, where $\underline{u}$ is a column state vector, and $\underline{v}$ is a row state vector. Let column state vectors have the alphabet $\underline{u}$ called column state space, and let row state vectors have the alphabet $\underline{v}$ called row state space. Then the state space is the Cartesian product of the column state space and the row state space, i.e., $s = u \times v$. The significance of these column and row state vectors is that they represent the reproduction pixels that are contiguous to the source block to be encoded.

As we mentioned earlier, a side-match vector quantizer must have a state codebook for each state in the state space. Let us begin describing state codebooks by assuming a super-codebook C. Given a state $s = (\underline{u}, \underline{v})$, the corresponding state codebook is defined to be the subset of the super-codebook C whose elements best "matches" $\underline{u}$ and $\underline{v}$ along the sides, i.e., along the first column and the first row, respectively. To be more precise, let us define the side-match distortion e as follows. We first let $[\underline{x}]_1^c$ and $[\underline{x}]_1^r$ denote the 1-th column and 1-th row vectors of a block $\underline{x}$, respectively. That is, $[\underline{x}]_l^c = (x_{11}, x_{21}, \ldots, x_{m1})^T$ and $[\underline{x}]_l^r = (x_{11}, x_{12}, \ldots, x_{1n})$, where $x_{jl}$ denotes the element of $\underline{x}$ on j-th row and 1-th column, and the superscript T denotes the transpose. Given the state $s = (\underline{u}, \underline{v})$ and an m by n block $\underline{x}$, the side-match distortion is defined as $e(s, \underline{x}) = a\, d(\underline{u}, [\underline{x}]_l^c) + b\, d(\underline{v}, [\underline{x}]_l^r)$, for some distortion measure d and weighting constants a and b. For example, the distortion measure can be mean squared error, and $a = b = \frac{1}{2}$. Then the state codebook $C_s$ for the state $s = (\underline{u}, \underline{v})$ is defined to be $C_s = (\underline{c}_1^s, \underline{c}_2^s, \ldots, \underline{c}_N^s)$ such that the elements of $C_s$ satisfy the following conditions:

(A) $\underline{c}_l^s \in C$ for $l = 1, 2, \ldots, N$.

(B) $e(s, \underline{c}_{l_1}^s) \leq e(s, \underline{c}_{l_2}^s)$ whenever $1 \leq l_1 \leq l_2 \leq N$.

(C) $e(s, \underline{c}_l^s) \leq e(s, \underline{c})$ for $l = 1, 2, \ldots, N$ and for all $\underline{c} \in C - C_s$.

In words, given a state s, the state codebook $C_s$ is a subset of the super-codebook that contains N codewords with the smallest side-match distortion, arranged in increasing order of side-match distortion. Note in this definition that the state codebook is not only a set but an ordered set (a sequence). This ordering information is of great importance when we consider noiseless coding hereinafter.

The quantizer and the de-quantizer of side-match vector quantizer are not different from the definition in general of a finite state vector quantizer or dequantizer, as the case may be. As defined in the previous section, the full search quantizer operation with the distortion measure d is $$q(\underline{x}, s) = \eta([\min_{\underline{c} \in C_s}{}^{-1} d(\underline{x}, \underline{c})], C_s),$$

and the de-quantizer operation is $p(y, s) = \underline{c}$ such that $\underline{c} \in C_s$ and $\eta(\underline{c}, C_s) = y$.

Figure 7:
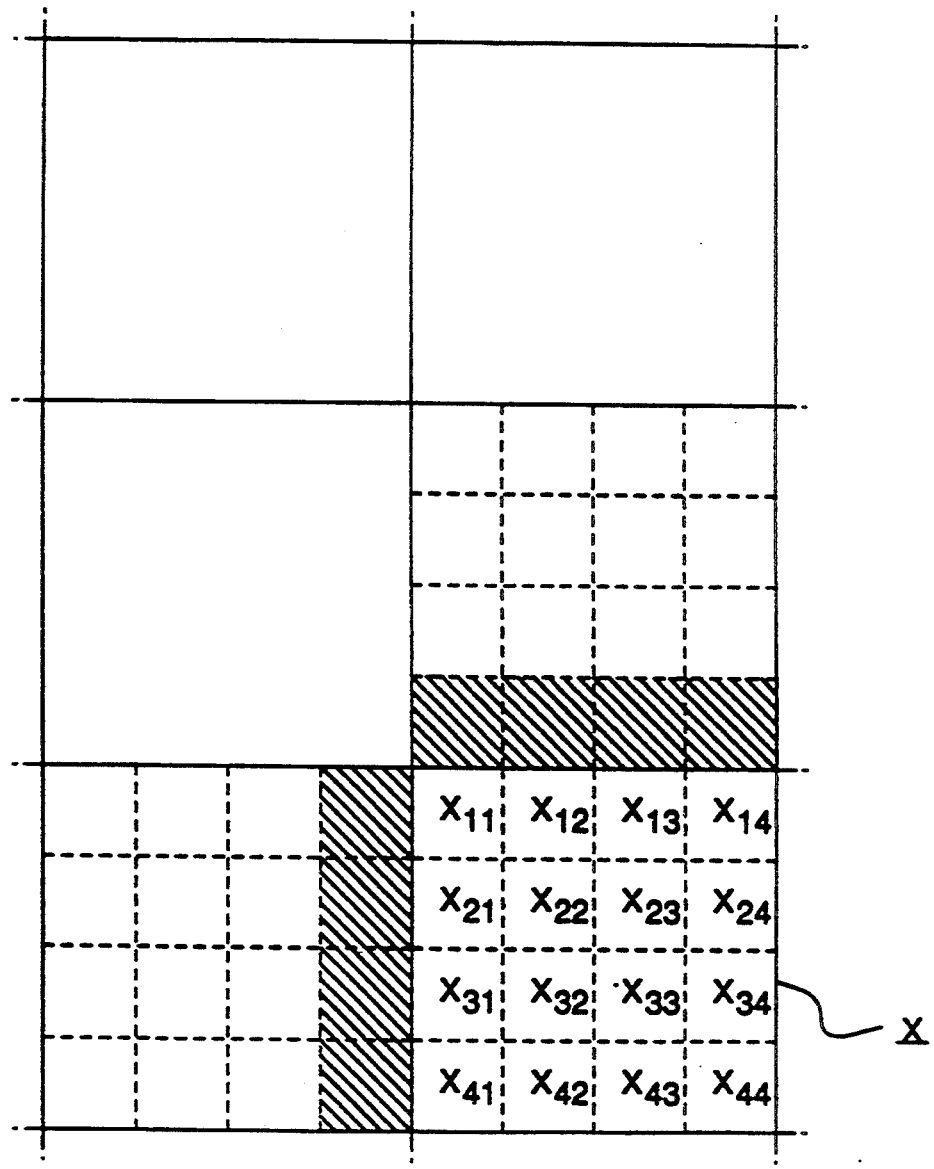
FIG. 7 shows the typical pixel arrangement for use of the "side match" arrangement for both training (codebook design) and encoding.

We now describe the next state function of side-match vector quantizer in the real encoding context. In a side-match vector quantizer, only two past reproduction blocks contribute to the generation of the state. Assuming that the encoding proceeds first left-to-right (west-to-east) and then top-to-bottom (north-to-south) in an image, these two reproduction blocks are the contiguous neighbors of the next source block in the north and west directions as shown in FIG. 7. Striped area in FIG. 7 corresponds to the pixels that contribute to the state generation for the encoding of the last block in the figure. Suppose that all the pixel blocks up to $\underline{x}_i$ have been encoded into $\ldots, \hat{\underline{x}}_{i-2}, \hat{\underline{x}}_{i-1}, \hat{\underline{x}}_i$, and that the next state function is preparing for the encoding of $\underline{x}_{i+1}$. Then, the next state function operation f is represented as $s_{i+1} = f(\hat{\underline{x}}_i, \hat{\underline{x}}_{i-J+1})$ where J is now the number of block columns in an image (i.e., the number of blocks that fit in the image width). In particular, the next state function maps the west reproduction block $\hat{\underline{x}}_i$ into the column state vector $u_{i+1}$, and the north reproduction block $\hat{\underline{x}}_{i-J+1}$ into the row state vector $v_{i+x}$. Given the column state space U and the row state space V, the column state vector and the row state vector are generated by the minimum distortion rule. That is, $$s_{i+1} = (u_{i+1}, v_{i+1})$$
$$= f(\hat{\underline{x}}_i, \hat{\underline{x}}_{i-J+1})$$

-continued $$= ([\min_{\underline{u} \in \underline{U}}{}^{-1}d(\underline{u}, [\hat{x}_i]_n{}^7)], [\min_{\underline{v} \in \underline{V}}{}^{-1}d(\underline{v}, [\hat{x}_{i-J+1}]_m{}^7)]).$$

Since the domain and the range of the mapping f are both finite and relatively small (in cardinality), the mapping f is realized by a look-up table.

Let us now describe the side-match vector quantizer encoding and decoding procedures as well as the design procedure we propose. In real image coding situations, there are several pixel blocks to which the side-match vector quantizer does not apply, because the state cannot be properly defined. They are the blocks at the top and the left boundaries of the image. Since arbitrarily assigning states to these blocks increases the encoding distortion not only for them but also for the blocks following them, we treat them separately from the rest. As a result, the rate of the code increases slightly (typically by fractions of one percent). If we ignore this increase, the rate of side-match vector quantizer is $\log_2 N/(m\ n)$ bits per pixel. For example, if $m=n=4$ (FIG. 7) and $N=256$, then the rate is $\frac{1}{2}$ bit per pixel.

SMVQ Encoding Procedure (1) Encode the first row and the first column of pixel blocks in the image by memoryless VQ (e.g., full search VQ) with the super-codebook.

For the rest of blocks, repeat only steps 2 and 3.

(2) Generate the state from the west and north reproduction blocks.

(3) Encode a block using the quantizer with the corresponding state codebook.

SMVQ Decoding Procedure (1) Decode the first row and the first column of pixel blocks in the image by table-lookup on the super-codebook. For the rest of blocks, repeat steps 2 and 3.

(2) Generate the state from the west and north reproduction blocks.

(3) Decode a block using the de-quantizer with the corresponding state codebook.

The design procedure of side-match vector quantizer is simple because the state codebook design does not require the source statistics.

Codebook Design Procedure

The design of the state codebooks according to the "side-match" and "overlap-match" principle is essential to the use of the invention for encoding two-dimensional information. Successful design is dependent upon the appropriate choices from among the huge number of possible quantized vectors.

There are 16 pixels per block to be encoded. In the typical system there are 256 grey levels possible for each pixel. Therefore, there are $(256)^{16}$, or more than 40 billion, possible vectors for each block.

Starting with two-dimensional data fields, or visual images, which in some sense can be considered typical for the intended use of the system, one must determine which code vectors of the $(256)^{16}$ possibilities are most representative.

Figure 4:
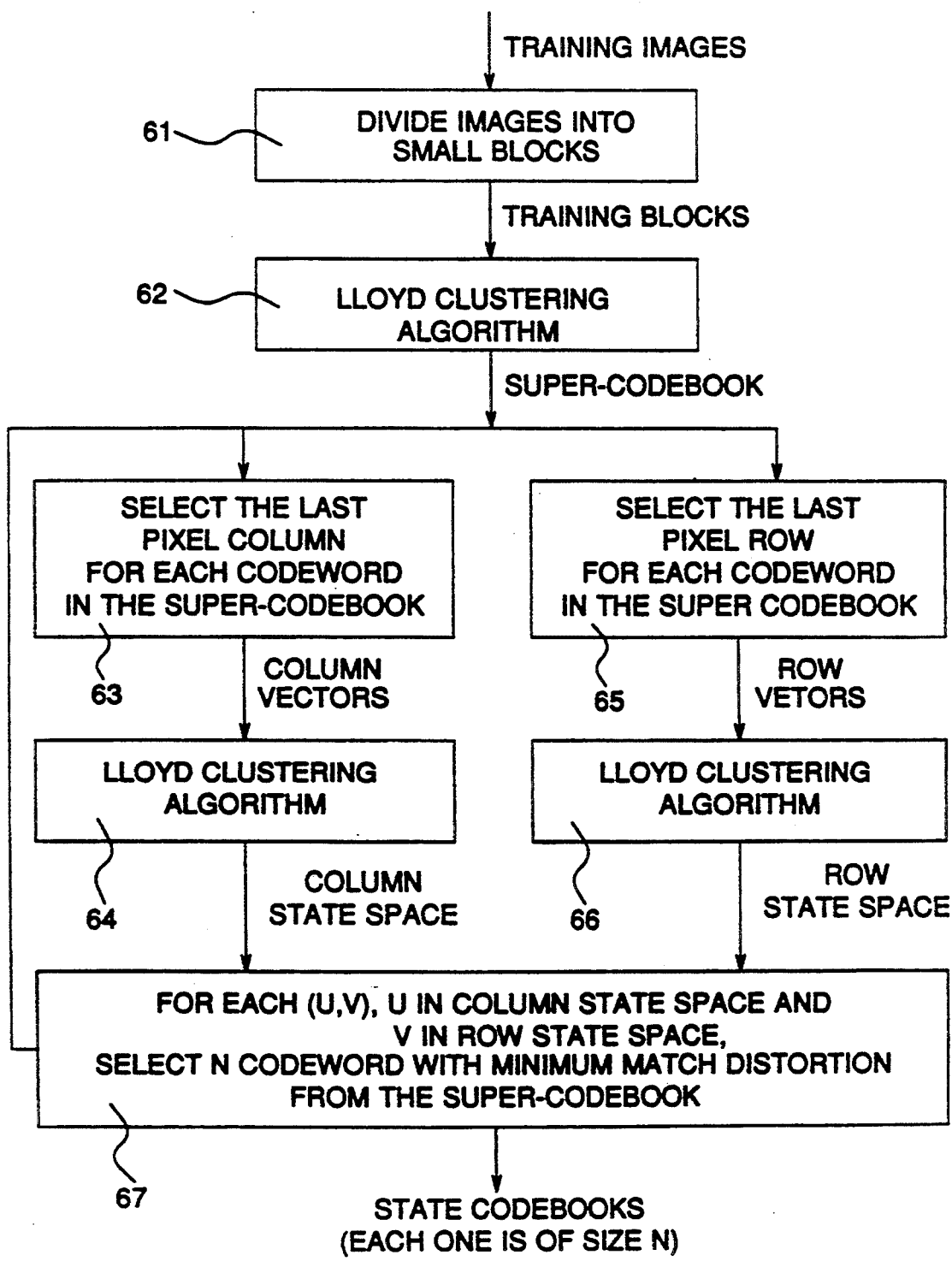
FIG. 4 is a flow-chart of the codebook design process for the invention.

Unlike the design procedure of the Aravind and Gersho reference, which starts with the differing state codebooks, which, then, incidentally together comprise a super codebook, the design procedure, as shown in FIG. 4, starts with the super codebook as the best 1,024 representatives of the pixel blocks found in the training images. Any of the well-known optimization techniques, such as the maximum likelihood technique, as applied to vectors, may be used.

Next, using the "side-match" and "overlap-match" principle, one may proceed to construct the differing state codebooks from the super codebook as follows:

Out of the over $10^6$ possible pairs of right-hand columns and bottom rows of the 1,024 representative blocks of the super codebook (in order to obtain those which are the ones used for the aforementioned "matching" to input two-dimensional information blocks to be encoded), select those pairs of columns and rows which are the best representatives of the super codebook blocks, as follows:

For each candidate pair of such $10^6$ pairs, the 256 best matching blocks, the top row thereof being matched to the row portion of the candidate pair and the left-hand column of each block being to the column portion of the candidate pair, form a tentative state codebook. Again, the best matching blocks for each candidate pair can be determined by any of the well-known optimization techniques for vectors, illustratively minimum side-match distortion.

Out of the over $10^6$ possible state codebooks, a reduced set, $=(128)^2=16,000$ (approximately), is selected as having the best aggregate scores (least aggregate distortions) for the 256 elements of each, as matched to the pair combinations of 128 row portions and the 128 column portions.

The state codebooks are represented in a memory or store which comprises the set 19 of state codebooks in FIG. 1.

Overlap-Match Vector Quantizers

Figure 8:
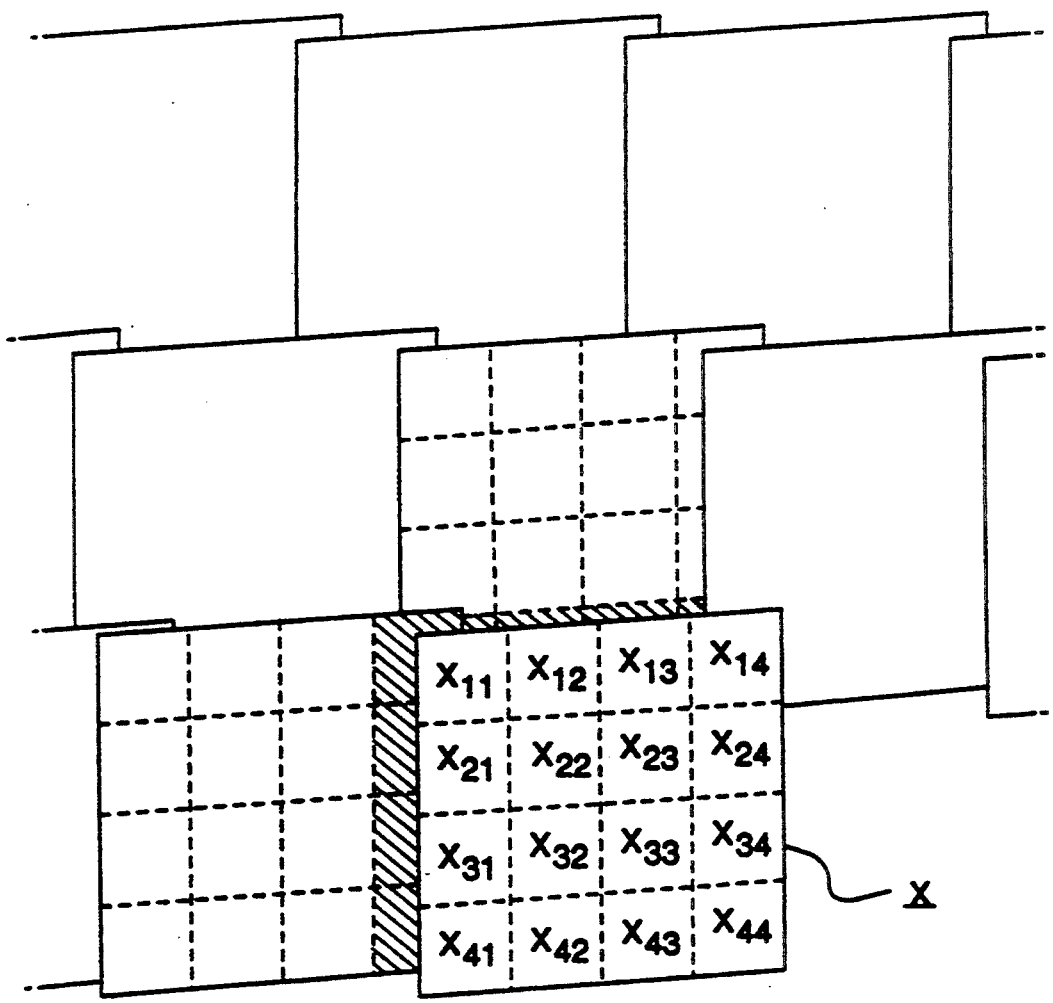
FIG. 8 shows the typical pixel arrangement for use of the "overlap match" arrangement for both training (codebook design) and encoding.

Overlap-match vector quantizer (OMVQ) is within a class of finite state vector quantizers which is quite similar to the side-match vector quantizer. Unlike any other VQ for images including the side-match vector quantizer, however, the source (pixel) blocks of OMVQ are constructed with partial overlaps. In other words, if the overlap width and height are $n_o$ columns and $m_o$ rows, respectively, the first $n_o$ columns of a source block are the replicas of the last $n_o$ columns of the source block to the left (west), and the first $m_o$ rows of a source block are the replicas of the last $m_o$ rows of the source block right above (north), with the exception of the blocks along the images boundaries. This situation is illustrated in FIG. 8 for the case of $m=n=4$ and $m_o=n_o=1$.

As the structure of OMVQ is very similar to that of side-match vector quantizer, we describe the building blocks of overlap-match vector quantizers by borrowing the notations we introduced in the previous section. The block diagram of overlap-match vector quantizers is shown in FIGS. 1 and 3. Suppose we consider source blocks of size m by n for OMVQ. Then each state in the state space is represented by a pair of blocks: an m by $n_o$ block called column state block and an $m_o$ by n block called row state block. That is, a state is of the form $(\underline{u}, \underline{v})$, where $\underline{u}$ is an m by $n_o$ column state block, and $\underline{v}$ is an $m_o$ by n row state block. Let column and row state blocks have alphabets $\underline{u}$ and $\underline{v}$, called the column state space and row state space, respectively. As in SMVQ, the state space S of OMVQ is the Cartesian product $\underline{u} \times \underline{v}$. The significance of these column and row state blocks is that they represent the reproduction pixels that overlap the source block to be encoded.

The state codebook of OMVQ is defined as follows. Given a supercodebook C and a state $s=(\underline{u}, \underline{v})$, the corresponding state codebook is defined to be the subset of C whose elements best "matches" $\underline{u}$ and $\underline{v}$ in the overlap region. In order to describe state codebooks of OMVQ, we redefine the match distortion e and name it the overlap-match distortion. As an extension to the notations introduced earlier, we let $[\underline{x}]_{11}{}^c,_{12}, \ldots, _{12}$ and $[\underline{x}]_{11}{}^r,_{12}, \ldots, _{1j}$ denote the m by j and j by n blocks formed by collecting columns $1_1$ through $1_j$ and by collecting rows $1_1$ through $1_j$, respectively. Given the state $s=(\underline{u}, \underline{v})$ and an m by n block $\underline{x}$, the overlap-match distortion is defined as $$e(s,\underline{x}) = a\, d(\underline{u}, [\underline{x}]_{11}{}^c, _{12}, \ldots, _{1n_o}) + b\, d(\underline{v}, [\underline{x}]_{11}{}^r, _{12}, \ldots, _{1m_o})$$

for some distortion measure d and constants a and b. Then, the definition of the state codebooks of OMVQ is the same as that in SMVQ with the side-match distortion replaced by the overlap-match distortion. That is, given a super codebook C and a state $s=(\underline{u}, \underline{v})$, the state codebook $C_s$ for the state s is defined to be $C_s = (\underline{c}_1{}^s, \underline{c}_2{}^s, \ldots, \underline{c}_N{}^s)$ such that the elements of $C_s$ satisfy the conditions (A), (B) and (C) of the previous section. Again, we would like to emphasize that the elements of each state codebook are sequentially ordered.

As we have established the state codebooks of OMVQ, the quantizer and the de-quantizer of OMVQ are not different from those of general FSVQ.

In order to describe the next state function of OMVQ, we assume that all the partially overlapped source blocks up to $\underline{x}_i$ have been encoded into $\ldots, \hat{\underline{x}}_{i-2}, \hat{\underline{x}}_{i-1}, \hat{\underline{x}}_i$. Then, the state $s_{i+1}$ is generated by the next state function f as $s_{i+1} = f(\hat{\underline{x}}_i, \hat{\underline{x}}_{i-J+1})$, where J is now the number of partially overlapping block columns in an image (i.e., the number of partially overlapping blocks that fit in the image width). If $\underline{n}$ denotes the number of pixel columns in the image, we can compute J by $J = (\underline{n}-n)/(n-n_o) + 1$. In particular, the next state function maps the west reproduction block $\hat{\underline{x}}_i$ into the column state block $\underline{u}_{i+1}$, and the north reproduction block $\hat{\underline{x}}_{i-J+1}$ into the row state block $\underline{v}_{i+1}$. Given the column state space $\underline{u}$ and the row state space $\underline{v}$, the column state block and the row state block are generated by minimum distortion rule. That is, $$\begin{aligned} s_{i+1} &= (\underline{u}_{i+1}, \underline{v}_{i+1}) \\ &= f(\hat{\underline{x}}_i, \hat{\underline{x}}_{i-J+1}) \\ &= ([\min_{\underline{u} \in U}{}^{-1} d(\underline{u}, [\hat{\underline{x}}_i]^c_{n-n_o+1, \ldots, n})], \\ &\quad [\min_{\underline{v} \in V}{}^{-1} d(\underline{v}, [\hat{\underline{x}}_{i-J+1}]^r_{m-m_o+1, \ldots, m})]). \end{aligned}$$

Since the domain and the range of the mapping f are both finite and relatively small (in cardinality), the mapping f is realized by a look-up table. The pixels that contribute to the state generation is shown as the striped area in FIG. 8.

As one must have noticed, the definition of OMVQ is parallel to that of SMVQ. Especially when $m_o=n_o=1$, one can look at OMVQ as SMVQ with a simple preprocessor. In particular, if the preprocessor constructs the "expanded image" by duplicating pixel rows and columns that would have been in the overlap region of OMVQ, the OMVQ process applied to an image is identical to the SMVQ process applied to the expanded image. However, one should note that the reconstructed image is also expanded.

In order to recover the reproduction image that is of the source image size, we introduce another building block called overlap removing function that maps every pair of duplicated pixels into a final reproduction pixel. Because of the quantization error, the duplicated pixels in the reproduction are not identical to their twin brothers. In other words, there are two different versions of reproduction for each duplicated pixel. It is quite conceivable that these two versions of reproduction contain more information about the source pixel than a single reproduction does. Therefore the overlap removing function should not simply discard one of the two versions of reproduction. To be specific, let the overlap removing function h be a mapping that applies to each twin pair of reproduction pixels that is duplicated in the encoder and produces one final reproduction pixel. If $x_1$ and $x_2$ denote a twin pair of reproduction pixels, the final reproduction pixel $\hat{x}$ is represented as $\hat{x} = h(x_1, x_2)$. An example of the overlap removing function is $h(x_1, x_2) = (x_1 + x_2)/2$.

Let us now describe the OMVQ encoding and decoding procedures as well as the design procedure. Given the state codebooks and the next state function, the encoding procedure of OMVQ is identical to that of SMVQ except that the source blocks partially overlap one another. On the other hand, the decoding procedure of OMVQ takes one more step compared to the SMVQ decoding procedure, namely, the overlap removing operation. So, the decoding procedure of OMVQ is simply that of SMVQ followed by the overlap removing operation.

The design procedure of OMVQ is again similar to that of SMVQ, and can be represented by FIG. 4.

OMVQ Design Procedure (1) Super-codebook:
Design a super-codebook using any codebook design algorithm.

(2) State Space:
Generate column state space and row state space by a codebook design algorithm using the last $n_o$ columns and the last $m_o$ rows of the codeword in the super-codebook as the training sets, respectively.

(3) State Codebook:
Design a state-codebook by choosing the subset of the super-codebook that satisfies the conditions of state codebooks, described above under "Design Procedure." When $m_o=n_o=1$, super-codebook, state codebooks, and state space can be interchangeably used between SMVQ and OMVQ.

Let us now return to the question of noiseless coding of the codeword index for transmission.

Because of the high correlation of images and the ordering in each state codebook by the match distortion, one can guess that the channel symbol distribution assumes a monotonically decreasing trend. By experiment, it is found that the channel symbol distribution is in fact close to $\{b\mu^{-a}: \mu = 1, 2, \ldots N\}$, for some constants a and b. In the following, a class of noiseless codes with only a few levels are proposed for the rapidly decaying distributions, and are shown to be nearly optimal.

The proposed noiseless code is basically the well-known Huffman code designed for the staircase approximation to fast decaying distributions. When the number of symbols is not a power of 2, however, the proposed noiseless code and the Huffman code for the approximation can be slightly different. Given a rapidly decreasing probability distribution P, $(P_1, P_2, \ldots, P_N)$, let us define the staircase approximation $\hat{P}$ such that for $j = 0, 1, 2, \ldots, \log_2 N$, assuming $\log_2 N$ is an integer, $$\hat{P}_\mu = \hat{P}_\nu, \text{ for all } 2^{j-1} < \mu, \nu \leq 2^j \quad (A)$$

$$\sum_{2^{j-1} < \mu \leq 2^j} \hat{P}_\mu = \sum_{2^{j-1} < \mu \leq 2^j} P_\mu. \quad (B)$$

Because of the part (B) of the definition, $\hat{P}$ is also a probability distribution. When N is large, the design of Huffman code for $\hat{P}$ is not in general a simple task. Since the distribution $\hat{P}$ is in a special form, however, the design of Huffman code can be greatly simplified as follows. We first design a Huffman prefix code for the set of probabilities.

$$\left\{ \sum_{2^{j-1} < \mu \leq 2^j} \hat{P}_\mu : j = 0, 1, 2, \ldots, \log_2 N \right\}.$$

Then, to distinguish symbols within the summing interval, for each j, a simple fixed length binary code, called the suffix, is attached to the Huffman prefix code. For each j, the number of symbols in the summing interval is $\lceil 2^{j-1} \rceil$ where $\lceil x \rceil$ denotes the smallest integer no smaller than x, and thus, the length of the suffix is $\max\{j-1, 0\}$. In this context, the meaning of "prefix code" is twofold: one is that every binary codeword in a prefix code is not a prefix in any other binary codeword in the code, and the other is that it is a prefix to the suffix. The resulting noiseless code is also a prefix code in the former sense. Furthermore, it is not difficult to show that when N is a power of 2, the proposed noiseless code is optimal for the distribution $\hat{P}$.

Codebook Design

In FIG. 4 is shown a flow diagram, the process by which the super codebook and all the state codebooks extracted therefrom are designed. In the first instance the training images should be selected to be statistically similar in some essential characteristic to those images which are to be transmitted. These are called the training images. In the first step, these training images are divided into small blocks in step 61. These training blocks are then clustered via the Lloyd clustering algorithm. The final result of the clustering process is to allow us to construct a super codebook of vector quantized codes, e.g., 1,024 of them. In the next step for assembling state codebooks from the super codebook, we begin to extract the characteristics that will allow one to select from the super codebook various components for the state codebooks. The first step in this process is illustrated in step 63 which involves the selection of the last pixel column for each codeword which is representing a block in the super codebook. These sets of last pixel columns are clustered according to the Lloyd clustering algorithm in step 64. The parallel process in which the last pixel row is selected includes the parallel steps 65 and 66; and clustering step 66 for the row vectors again selects the N codewords with minimum match distortion from the super codebook, so that from these two parallel processes, we eventually achieve state codebooks, each one of which is of size N, e.g., N=256. Specifically, the information in the clustered codewords is organized as follows: For each $\underline{u}$ and $\underline{v}$ respectively, which are pair of values for which $\underline{u}$ is in the column state space and $\underline{v}$ is in the row state space, we select the N codewords with minimum match distortion from the super codebook. The selection of codewords with minimum match distortion as required in step 67 involves match distortion computation and search which are computation intensive, to construct, for example, 16,000 state codebooks. It is advantageous that this intensive calculation is achieved with analogous images prior to the real time operation of transmitter 10 of FIG. 1.

Figure 5:
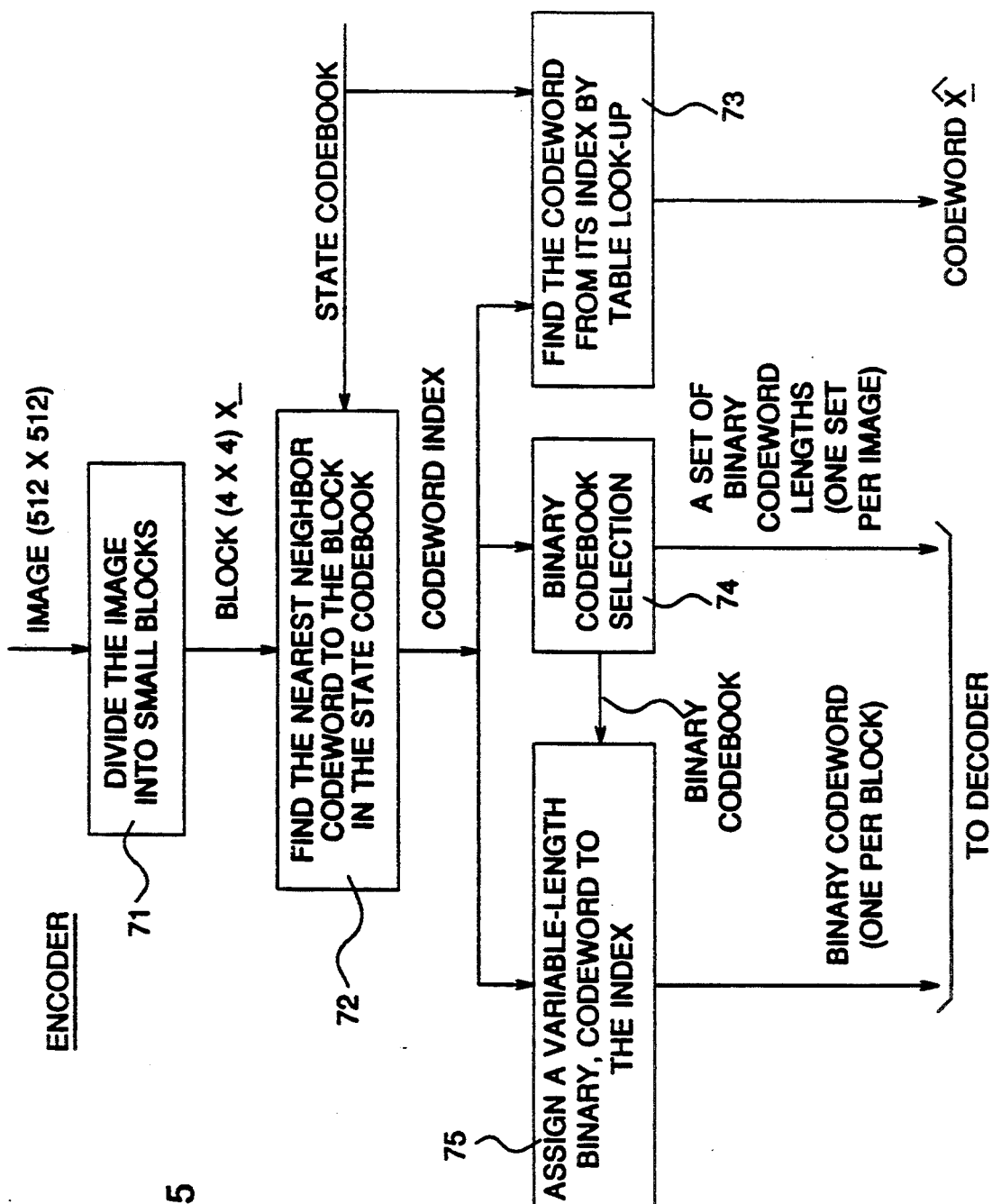
FIG. 5 is a flow-chart for the operation of the invention during the actual process of encoding image information.
Figure 6:
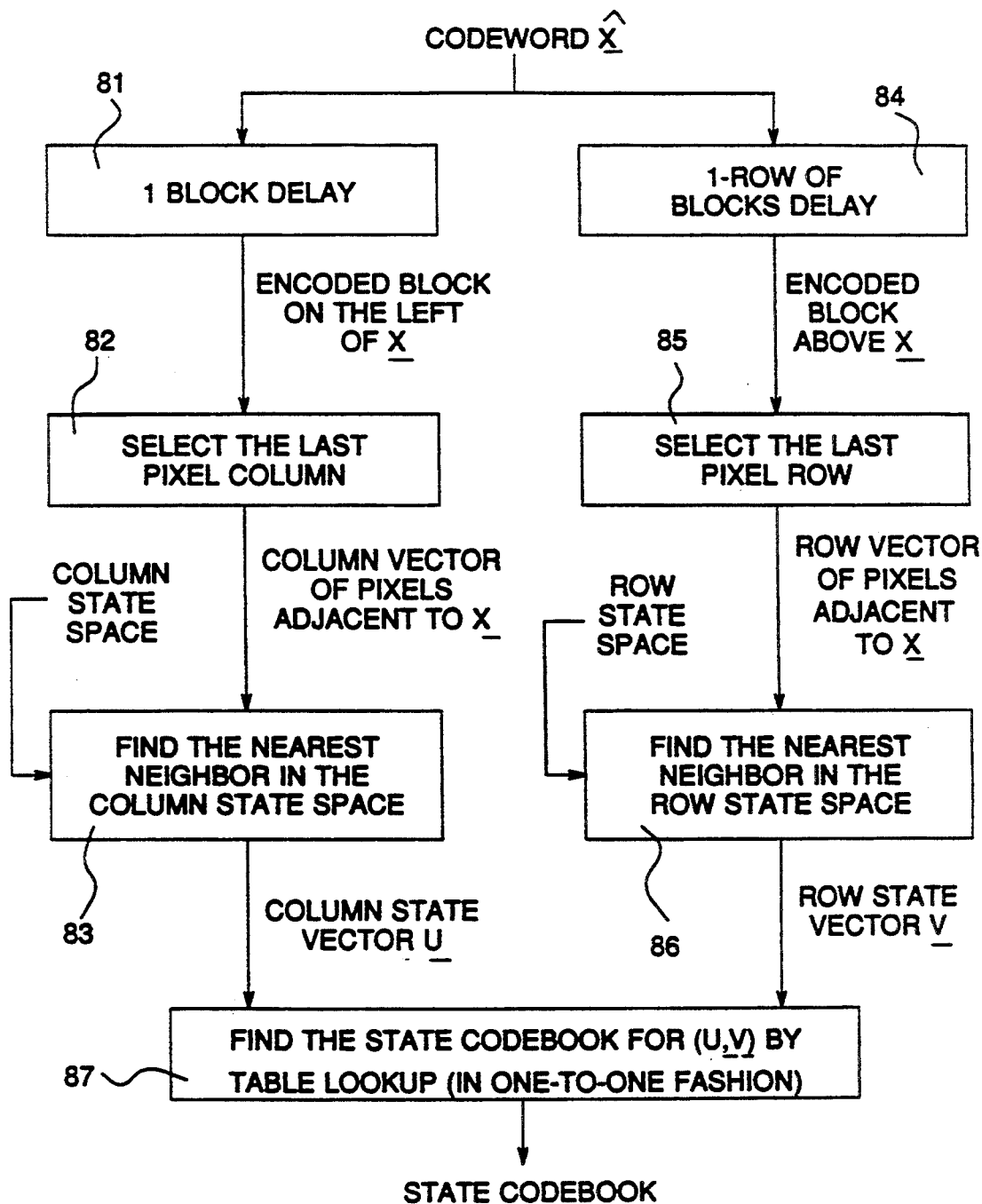
FIG. 6 is a flow-chart for the technique for finding the next state codebook.

In FIG. 5 is shown a flow diagram which allows us to explain the operation of encoder 41 of FIG. 1 in a slightly different manner to aid understanding. The steps here have obvious analogues in block in FIG. 1. For instance, step 71 divides the input image to be transmitted into small blocks of four by four pixels. Step 72 finds the nearest neighbor of codeword in the current state book, according to the minimum mean square error nearest neighbor search technique already described. The resulting codeword index derived from the state codebook is then reconverted to its codeword in step 73 in order to provide the historical image statistics needed for my minimum edge discontinuity or minimum overlap discontinuity techniques as mathematically above described. The codeword index is also applied to the transmission binary encoding step 74 to allow the assignment of variable length noiseless binary codeword to the index in step 75. The codeword resulting from the table lookup of step 73 (analogous to dequantizer 13) is applied to the logic circuit 42 of FIG. 1 as shown in the steps of FIG. 6. It will be noted that FIGS. 5 and 6 fit together. As shown in FIG. 5, for the adjacent column side-match operation, this step 81 introduces a one-block delay so that the encoded block to the left of the currently encoded pixel block $\underline{x}$ is to be represented during the encoding of $\underline{x}$. That encoded block immediately to the left of pixel block $\underline{x}$ is in the last previous pixel column, this being the nearest neighbor in the column state space as stated in step 83. For that column state $\underline{u}$, we then employ a similar vector v derived from the analogous blocks 84, 85 and 86 which involves a greater delay so that the block in the previously encoded row or set of rows is used for the continuity test resulting in a row state vector $\underline{v}$ (which represents the nearest neighbor in the lower state). We then find the appropriate state codebook for the vectors $\underline{u}$ and $\underline{v}$ by table lookup and that results in a choice of state codebook in step 87. Note at this point the difference between side-match and overlap-match is the following: In side-match vector quantization according to the invention, the pixel blocks of the images are not overlapped so that rows 1, 2, 3 and 4 represent the first set of blocks, rows 5, 6, 7 and 8 represent the second of blocks, etc., and a similar principle applies for columns. In overlap-match vector quantization, rows 1, 2, 3 and 4 represent the first set of blocks, then rows 4, 5, 6 and 7 represent the second set of blocks, so that the pixels in row 4 now get encoded into different blocks sequentially after appropriate delays in such a way as to minimize the degree of intensity change in their encoding from row to row. The change is minimized by the overlap but some change is forced by the fact that other values are present in the block, for example, from row 3. Both of these techniques contrast to the technique of Aravind and Gersho in that the latter emphasizes the degree of continuity between pixels across an edge that may pass through the block without to the edges of the respective blocks themselves. In contrast, the technique described herein spatial contiguity without the degree of dilution that occurs by transforming pixel values into indirect information as done by Aravind and Gersho.

It should be apparent that the direct uses of the spatial contiguity information in individual pixel values which are have termed side-matched vector quantization and overlapped matched vector quantization could be applied in embodiments differing from those above. For example, one could consider individual pixel values in two adjacent rows and two adjacent columns.

I claim:

1. A method implemented in a circuit for encoding a first signal to form an encoded signal, said first signal representing a particular block in an array of blocks, wherein each block in said array of blocks comprises an array of pixels, said method comprising the steps of:
   a. selecting, based solely on the last row of pixels in the block in said plurality of blocks above said particular block and in the right-most column of pixels in the block in said plurality of blocks to the left of said particular block, a codebook from among a plurality of codebooks wherein each codebook comprises codewords and wherein each codeword has an associated index, wherein the step of selecting a codebook comprises the steps of:
      1. forming a first codeword based on a first index, said first index being associated with the codeword in the codebook used to encode the block that is above said particular block;
      2. forming a second codeword based on a second index, said second index being associated with the codeword in the codebook used to encode the block that is to the left of said particular block;
      3. generating a row state output signal by delaying said first codeword by one row and filtering said first codeword to pass only the last row of pixels in the array of pixels in the block that is above said particular block;
      4. generating a column state output signal by delaying said second codeword by one column and filtering said second codeword to pass only the right-most column of pixels in the array of pixels in the block that is to the left of said particular block; and
      5. selecting said codebook based on said row state output signal and said column state output signals;
   b. selecting a codeword in the selected codebook which codeword best approximates said particular block based on a predetermined error criterion;
   c. forming said encoded signal based on the index associated with said selected codeword; and
   d. transmitting said encoded signal over a communication channel.

2. A method implemented in a circuit for encoding a first signal to form an encoded signal, said first signal representing a particular block in an array of blocks, wherein each block in said array of blocks comprises an array of pixels, said method comprising the steps of:
   a. selecting, based solely on the last row of pixels in the block in said plurality of blocks above said particular block and in the right-most column of pixels in the block in said plurality of blocks to the left of said particular block, a codebook from among a plurality of codebooks wherein each codebook comprises codewords and wherein each codeword has an associated index;
   b. selecting a codeword in the selected codebook which codeword best approximates said particular block based on a predetermined error criterion, wherein the step of selecting a codeword comprises the steps of:
      1. generating a super codebook based on a set of codewords derived from a set of training blocks, wherein each of said training blocks comprises an array of pixels, and
      2. generating a plurality of codebooks from said super codebook by a method comprising the steps of:
         i. pairing the portion of each of the codewords in said training blocks representing the last row of pixels in said training blocks with the portion of each of the codewords in said training blocks representing the right-most column of pixels in said training blocks,
         ii. selecting, for each of said pairs, a subset of said set of codewords that best matches said pair according to an error criterion, said subset of codewords forming the codebook associated with each of said pairs, and
         iii. further selecting a subset of said codebooks wherein said codewords of each of said selected codebooks in said subset of codebooks satisfy a distortion measure;
   c. forming said encoded signal based on the index associated with said selected codeword; and
   d. transmitting said encoded signal over a communication channel.

3. A method implemented in a circuit for decoding a second signal received from a communication channel to form a decoded signal, said second signal representing an index associated with a codeword wherein said codeword represents a particular block in an array of blocks, wherein each block comprises an array of pixels, said method comprising the steps of:
   a. receiving said second signal from said communication channel;
   b. selecting a codebook from among a plurality of codebooks, wherein a plurality of codewords are stored in each codebook and wherein an index identifies each of said codewords, said selecting being based solely on the last row of pixels in the block above said particular block and on the right-most column of pixels in the block to the left of said particular block, wherein said step of selecting a codebook comprises the steps of:
      1. forming a first codeword based on a first index, said first index being associated with the codeword in the codebook used to encode the block that is above said particular block;
      2. forming a second codeword based on a second index, said second index being associated with the codeword in the codebook used to encode the block that is to the left of said particular block;
      3. generating a row state output signal by delaying said first codeword by one row and filtering said first codeword to pass only the last row of pixels in the array of pixels in the block that is above said particular block;
      4. generating a column state output signal by delaying said second codeword by one column and filtering said second codeword to pass only the right-most column of pixels in the array of pixels in the block that is to the left of said particular block; and 5. selecting said codebook based on said row state output signal and said column state output signals;

c. determining from among only the codewords in the selected codebook said codeword for said particular block identified by said index; and d. forming said decoded signal based on said codeword.

4. A method implemented in a circuit for decoding a second signal received from a communication channel to form a decoded signal, said second signal representing an index associated with a codeword wherein said codeword represents a particular block in an array of blocks, wherein each block comprises an array of pixels, said method comprising the steps of:

a. receiving said second signal from said communication channel;

b. selecting a codebook from among a plurality of codebooks, wherein a plurality of codewords are stored in each codebook and wherein an index identifies each of said codewords, said selecting being based solely on the last row of pixels in the block above said particular block and on the right-most column of pixels in the block to the left of said particular block;

c. determining from among only the codewords in the selected codebook said codeword for said particular block identified by said index, wherein said determining comprises the steps of:

1. generating a super codebook based on a set of codewords derived from a set of training blocks, wherein each of said training blocks comprises an array of pixels; and 2. generating a plurality of codebooks from said super codebook by a method comprising the steps of:

i. pairing the portion of each of the codewords in said training block representing the last row of pixels in said training blocks with the portion of each of the codewords in said training blocks representing the right-most column of pixels in said training blocks, ii. selecting, for each of said pairs, a subset of said set of codewords that best matches said pair according to an error criterion, said subset of codewords forming the codebook associated with each of said pairs, and iii. further selecting a subset of said codebooks wherein said codewords of each of said selected codebooks in said subset of codebooks satisfy a distortion measure d. forming said decoded signal based on said codeword.

* * * * *